US009392253B2

(12) United States Patent
Yang et al.

(10) Patent No.: US 9,392,253 B2
(45) Date of Patent: Jul. 12, 2016

(54) ELECTRONIC DEVICE AND METHOD FOR DISPLAYING STEREO-VIEW OR MULTIVIEW SEQUENCE IMAGE

(75) Inventors: Jeong Hyu Yang, Pyeongtaek-si (KR); Jin Seok Im, Pyeongtaek-si (KR); Jung Eun Lim, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 863 days.

(21) Appl. No.: 13/031,947

(22) Filed: Feb. 22, 2011

(65) Prior Publication Data

US 2011/0254929 A1    Oct. 20, 2011

Related U.S. Application Data

(60) Provisional application No. 61/306,909, filed on Feb. 22, 2010.

(30) Foreign Application Priority Data

Feb. 18, 2011    (KR) .................. 10-2011-0014769

(51) Int. Cl.
H04N 13/04    (2006.01)
H04N 13/00    (2006.01)
G02B 27/22    (2006.01)

(52) U.S. Cl.
CPC ........ *H04N 13/0048* (2013.01); *G02B 27/2264* (2013.01); *H04N 13/0029* (2013.01)

(58) Field of Classification Search
CPC .................. H04N 13/0497; H04N 13/0404
USPC .......................................................... 348/51
See application file for complete search history.

(56) References Cited

U.S. PATENT DOCUMENTS

| 6,055,012 A | 4/2000 | Haskell et al. |
| 6,075,556 A | 6/2000 | Urano et al. .................... 348/43 |
| 6,449,003 B1 | 9/2002 | Mayer et al. |
| 2002/0009137 A1* | 1/2002 | Nelson et al. .............. 375/240.1 |
| 2008/0094468 A1* | 4/2008 | Tseng et al. .................... 348/43 |

(Continued)

FOREIGN PATENT DOCUMENTS

| CA | 2 380 105 A1 | 10/2003 |
| CN | 1647546 A | 7/2005 |

(Continued)

OTHER PUBLICATIONS

International Search Report dated Nov. 4, 2011 issued in Application No. PCT/KR2011/001159 (with English translation).

(Continued)

*Primary Examiner* — Chikaodili E Anyikire
(74) *Attorney, Agent, or Firm* — KED & Associates, LLP

(57) ABSTRACT

An electronic device and a 3D image display method are disclosed. A receiver receives 3D video data including left-view video data and right-view video data. A formatter generates a first video frame and a second video frame, wherein the first video frame includes first pixel data of one of the left-view video frame and the right-view video frame in odd lines and includes second pixel data of the other of the left-view video frame and the right-view video frame in even lines, and wherein the second video frame includes third pixel data of one of the left-view video frame and the right-view video frame in odd lines and includes fourth pixel data of the other of the left-view video frame and the right-view video frame in even lines. A display scans the first video frame and the second video frame.

7 Claims, 14 Drawing Sheets

(56) References Cited

U.S. PATENT DOCUMENTS

| | | | |
|---|---|---|---|
| 2008/0303893 A1* | 12/2008 | Kim et al. | 348/42 |
| 2009/0122134 A1* | 5/2009 | Joung et al. | 348/42 |
| 2009/0219382 A1* | 9/2009 | Routhier et al. | 348/43 |
| 2010/0208750 A1* | 8/2010 | Kim et al. | 370/474 |
| 2011/0010739 A1* | 1/2011 | Yun et al. | 725/39 |
| 2011/0050851 A1* | 3/2011 | Chen et al. | 348/43 |

FOREIGN PATENT DOCUMENTS

| | | |
|---|---|---|
| DE | 196 52 803 C1 | 6/1998 |
| JP | 08-070475 A | 3/1996 |
| JP | 4341751 B2 | 10/2009 |
| KR | 10-2009-0079959 A | 7/2009 |
| WO | WO 2005/079078 A1 | 8/2005 |

OTHER PUBLICATIONS

Chinese Office Action dated Apr. 23, 2014 issued in Application No. 201180019654.3 (with English Translation).

European Search Report for EP 11 74 4941.3 dated Mar. 6, 2015.

* cited by examiner

FIG. 8

| Frame1 (810) | Frame2 (820) |
|---|---|
| L1 | L2 |
| R1 | R2 |
| L3 | L4 |
| R3 | R4 |
| L5 | L6 |
| R5 | R6 |
| L7 | L8 |
| R7 | R8 |
| L9 | L10 |
| ... | ... |
| L1079 | L1080 |
| R1079 | R1080 |

FIG. 9

| Frame1 (910) | Frame2 (920) |
|---|---|
| L1 | L2 |
| R2 | R1 |
| L3 | L4 |
| R4 | R3 |
| L5 | L6 |
| R6 | R5 |
| L7 | L8 |
| R8 | R7 |
| L9 | L10 |
| ... | ... |
| L1079 | L1080 |
| R1080 | R1079 |

ELECTRONIC DEVICE AND METHOD FOR DISPLAYING STEREO-VIEW OR MULTIVIEW SEQUENCE IMAGE

This application claims the benefit of U.S. Provisional Application No. 61/306,909, filed on Feb. 22, 2010 and Korean Application No. 10-2011-0014769, filed on Feb. 18, 2011 which are hereby incorporated by reference as if fully set forth herein.

BACKGROUND OF THE INVENTION

1. Field of the Invention

The present invention relates to an electronic device and a 3-Dimensional (3D) image display method, and more particularly, to an electronic device and a 3D image display method which can process 3D images in stereo-view or multi-view 3D image technology.

2. Discussion of the Related Art

Commercial 3D content and 3D broadcasts mainly use a binocular disparity method. When a person looks at one subject through both eyes, there is a difference in location between an image seen through the left eye and an image seen through right eye. The difference corresponds to an interval between the both eyes in a horizontal direction and is referred to as binocular disparity. Accordingly, such images are provided to both eyes of a viewer, the viewer can perceive 3D imagery. Thus, a 3D effect may be obtained by providing, to both eyes of a viewer, images generated by capturing an actual subject using a binocular camera or, in case of a Computer Graphics (CG), by mapping the CG subject in the form of the binocular camera.

SUMMARY OF THE INVENTION

Accordingly, the present invention is directed to an electronic device and a method for displaying stereo-view or multi-view sequence images that substantially obviate one or more problems due to limitations and disadvantages of the related art.

To achieve these objects and other advantages and in accordance with the purpose of the invention, as embodied and broadly described herein, a 3-Dimensional (3D) image display method includes receiving 3D video data including left-view video data and right-view video data, generating a first video frame and a second video frame based on the left-view video data and the right-view video data, wherein the first video frame includes first pixel data of one of the left-view video frame and the right-view video frame in odd lines and includes second pixel data of the other of the left-view video frame and the right-view video frame in even lines, and wherein the second video frame includes third pixel data of one of the left-view video frame and the right-view video frame in odd lines and includes fourth pixel data of the other of the left-view video frame and the right-view video frame in even lines, and outputting the first video frame and the second video frame.

The first pixel data may be odd line data, the second pixel data may be odd line data, the third pixel data may be even line data, and the fourth pixel data may be even line data.

The first pixel data may be odd line data, the second pixel data may be even line data, the third pixel data may be even line data, and the fourth pixel data may be odd line data.

The first pixel data may be even line data, the second pixel data may be even line data, the third pixel data may be odd line data, and the fourth pixel data may be odd line data.

Pixel data included in a first line of the first video frame may be equal to pixel data included in a first line of the second video frame. Pixel data included in a second odd line of the first video frame may be even line data and pixel data included in a second odd line of the second video frame may be odd line data. In addition, pixel data included in a second odd line of the first video frame may be odd line data and pixel data included in a second odd line of the second video frame may be even line data.

The generation of the first video frame and the second video frame may include performing vertical filtering on the left-view video data and the right-view video data.

A resolution of each of the left-view video data and the right-view video data may be one of 720×480p, 1280×720p, 1920×1080i, 1920×1080p and 4K×2K, if the resolution is 720×480p, then the first video frame and the second video frame may have a resolution of 720×480p, if the resolution is 1280×720p, then the first video frame and the second video frame may have a resolution of 1280×720p, if the resolution is one of 1920×1080i and 1920×1080p, then the first video frame and the second video frame may have a resolution of 1920×1080p, and if the resolution is 4K×2K, then the first video frame and the second video frame may have a resolution of 4K×2K.

In another aspect of the present invention, a 3-Dimensional (3D) image display method includes receiving 3D video data including left-view video data and right-view video data, converting a frame rate of each of the left-view video data and the right-view video data to half an output frame rate, generating a first video frame and a second video frame based on the left-view video data having the converted frame rate and the right-view video data having the converted frame rate, wherein the first video frame includes first pixel data of one of the left-view video frame and the right-view video frame in odd lines and includes second pixel data of the other of the left-view video frame and the right-view video frame in even lines, and wherein the second video frame includes third pixel data of one of the left-view video frame and the right-view video frame in odd lines and includes fourth pixel data of the other of the left-view video frame and the right-view video frame in even lines, and outputting the first video frame and the second video frame.

In a further aspect of the present invention, an electronic device includes a receiver configured to receive 3-dimensional (3D) video data including left-view video data and right-view video data, a formatter configured to generate a first video frame and a second video frame, wherein the first video frame includes first pixel data of one of the left-view video frame and the right-view video frame in odd lines and includes second pixel data of the other of the left-view video frame and the right-view video frame in even lines, and wherein the second video frame includes third pixel data of one of the left-view video frame and the right-view video frame in odd lines and includes fourth pixel data of the other of the left-view video frame and the right-view video frame in even lines, and a display configured to scan the first video frame and the second video frame.

The first pixel data may be one of odd line data and even line data, if the first pixel data is odd line data, then the second pixel data may be odd line data, the third pixel data may be even line data, and the fourth pixel data may be even line data, and if the first pixel data is even line data, then the second pixel data is even line data, then the third pixel data may be odd line data and the fourth pixel data may be odd line data.

The first pixel data may be odd line data, the second pixel data may be even line data, the third pixel data may be even line data, and the fourth pixel data may be odd line data.

Pixel data included in a first line of the first video frame may be equal to pixel data included in a first line of the second video frame. Pixel data included in a second odd line of the first video frame may be one of even line data and odd line data, if the pixel data included in the second odd line of the first video frame is even line data, then pixel data included in a second odd line of the second video frame may be odd line data, and if the pixel data included in the second odd line of the first video frame is odd line data, then the pixel data included in the second odd line of the second video frame may be even line data. Two frames of the first video frame and the second video frame may form one 3D image.

The formatter may perform vertical filtering on the left-view video data and the right-view video data.

A resolution of each of the left-view video data and the right-view video data may be one of 720×480p, 1280×720p, 1920×1080i, 1920×1080p and 4K×2K, if the resolution is 720×480p, then the first video frame and the second video frame may have a resolution of 720×480p, if the resolution is 1280×720p, then the first video frame and the second video frame may have a resolution of 1280×720p, if the resolution is one of 1920×1080i and 1920×1080p, then the first video frame and the second video frame may have a resolution of 1920×1080p, and if the resolution is 4K×2K, then the first video frame and the second video frame may have a resolution of 4K×2K.

The electronic device may further include a frame rate converter configured to convert a frame rate of each of the left-view video data and the right-view video data to half an output frame rate.

According to an electronic device and a 3D image display method of the present invention, since 3D images of left full resolution and right full resolution are displayed through two frames in a 3D TV of a patterned retarder type, a viewer can view 3D images at a maximum resolution above half resolution. Therefore, the present invention enables many people to simultaneously view 3D images using glasses of low cost which is an advantage of a 3D display of a patterned retarder type and at the same time to view 3D images at full resolution which is an advantage of a 3D display of an active shutter type. Furthermore, the present invention can display 3D images brighter than 3D images of a display of the active shutter type.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a diagram illustrating a configuration of a first embodiment of pixel data of a first video frame and a second video frame generated by the electronic device according to the present invention;

FIG. 9 is a diagram illustrating a configuration of a second embodiment of pixel data of a first video frame and a second video frame generated by the electronic device according to the present invention;

DETAILED DESCRIPTION OF THE INVENTION

Reference will now be made in detail to the exemplary embodiments of the present invention with reference to the accompanying drawings. The configuration and operation of the present invention, which are illustrated in and described by the accompanying drawings, are described as at least one embodiment. However, it will be apparent to those skilled in the art that the technical spirit and essential configuration and operation of the present invention are not limited to the specific embodiment as set forth herein.

Although the terms used in the present invention are selected from general ones widely used in the art while considering their functions in the present invention, they may vary according to intention of a person skilled in the art, usual practice, the advent of new technology, etc. Also, in a specific case, the terms used in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Figure 1:
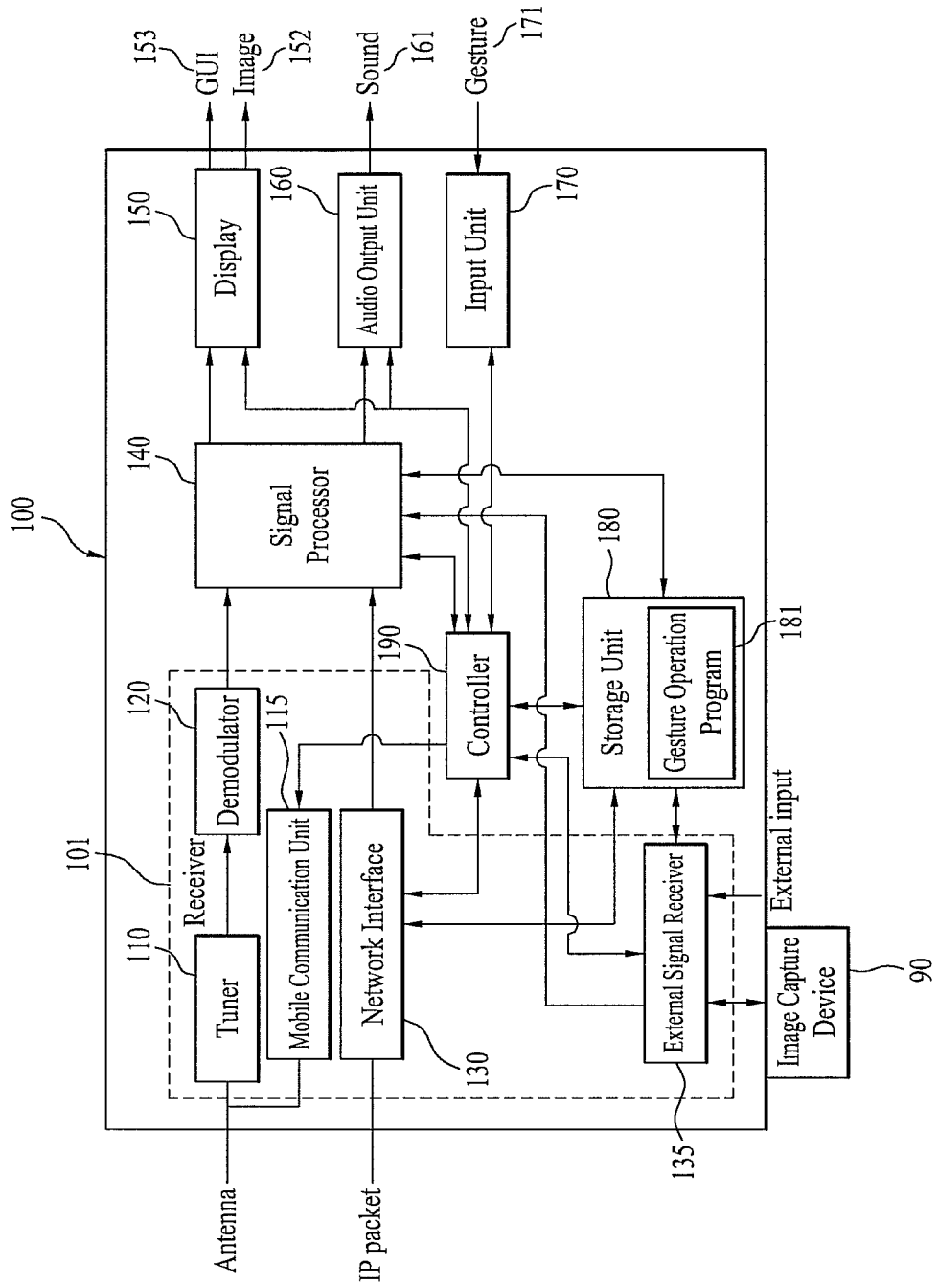
FIG. 1 is a block diagram illustrating a configuration of an exemplary embodiment of an electronic device according to the present invention.

FIG. 1 is a block diagram illustrating a configuration of an exemplary embodiment of an electronic device according to the present invention.

Referring to FIG. 1, an electronic device 100 according to the present invention may include a receiver 101, a signal processor 140, a display 150, an audio output unit 160, an input unit 170, a storage unit 180, and a controller 190. The electronic device 100 may be a personal computer, such as a desktop computer, a laptop computer, a tablet, or a handheld computer. The electronic device 100 may also be a mobile terminal such as a cellular phone, a smart phone, a Digital Multimedia Broadcasting (DMB) terminal, a Personal Digital Assistants (PDA), a Portable Multimedia Player (PMP), or a navigator, and may be a fixed electric appliance such as a digital TV.

The receiver 101 may receive broadcast data, video data, audio data, information data, and program code. The video data may be 3D data of a binocular disparity type. The 3D data may be a stereo-view or multi-view image. That is, the 3D data may include at least one of left-view video data and right-view video data. The 3D data may have a single video stream format or a multi-video stream format.

Figure 2:
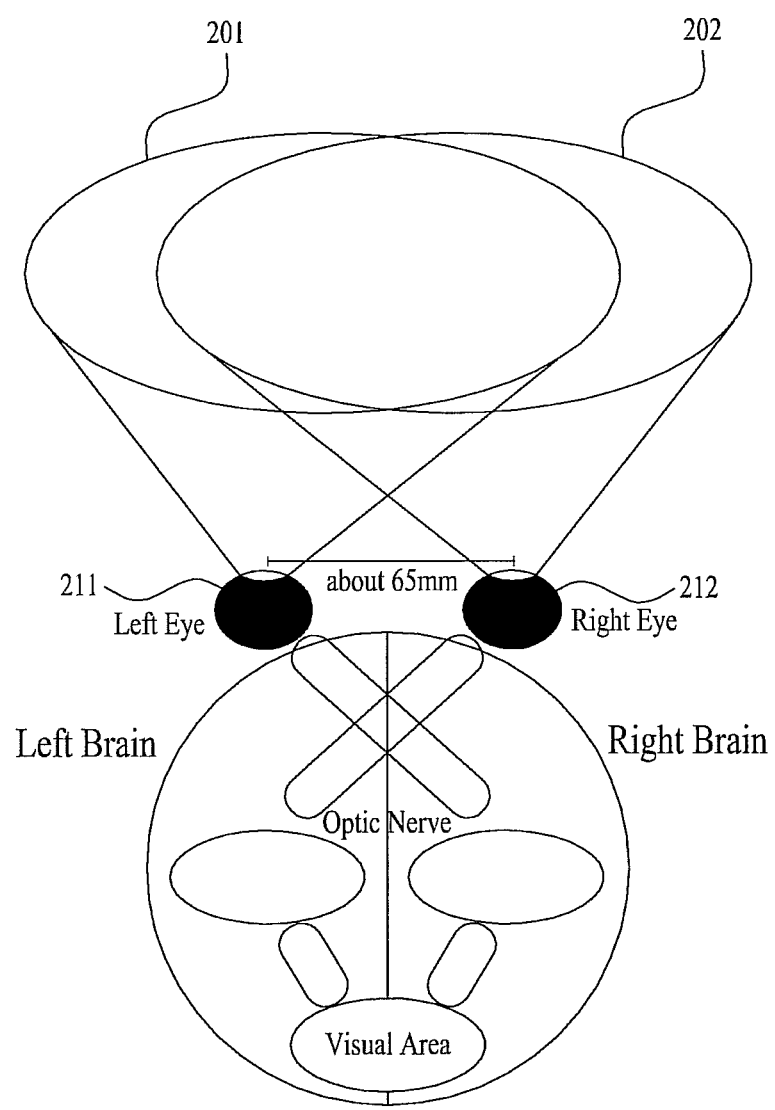
FIG. 2 is a diagram explaining binocular disparity.

FIG. 2 is a diagram explaining binocular disparity.

Referring to FIG. 2, binocular disparity refers to a 3D display scheme for providing a sense of space or 3D by showing viewer's eyes 211 and 212 a left-view image 201 and a right-view image 202 captured using a binocular camera etc. The sense of space or 3D provided to a viewer may differ according to binocular disparity between the left-view image 201 and the right-view image 202.

As an interval between the left-view image 201 and the right-view image 202 decreases, since it is recognized that an image is formed at a distance far away from the left eye 211 and the right eye 212, the sense of space or 3D provided to a viewer may be decreased. Also, as an interval between the left-view image 201 and the right-view image 202 increases, since it is recognized that an image is formed at a distance close to the left eye 211 and the right eye 212, the sense of space or 3D provided to a viewer may be increased.

Figure 3:
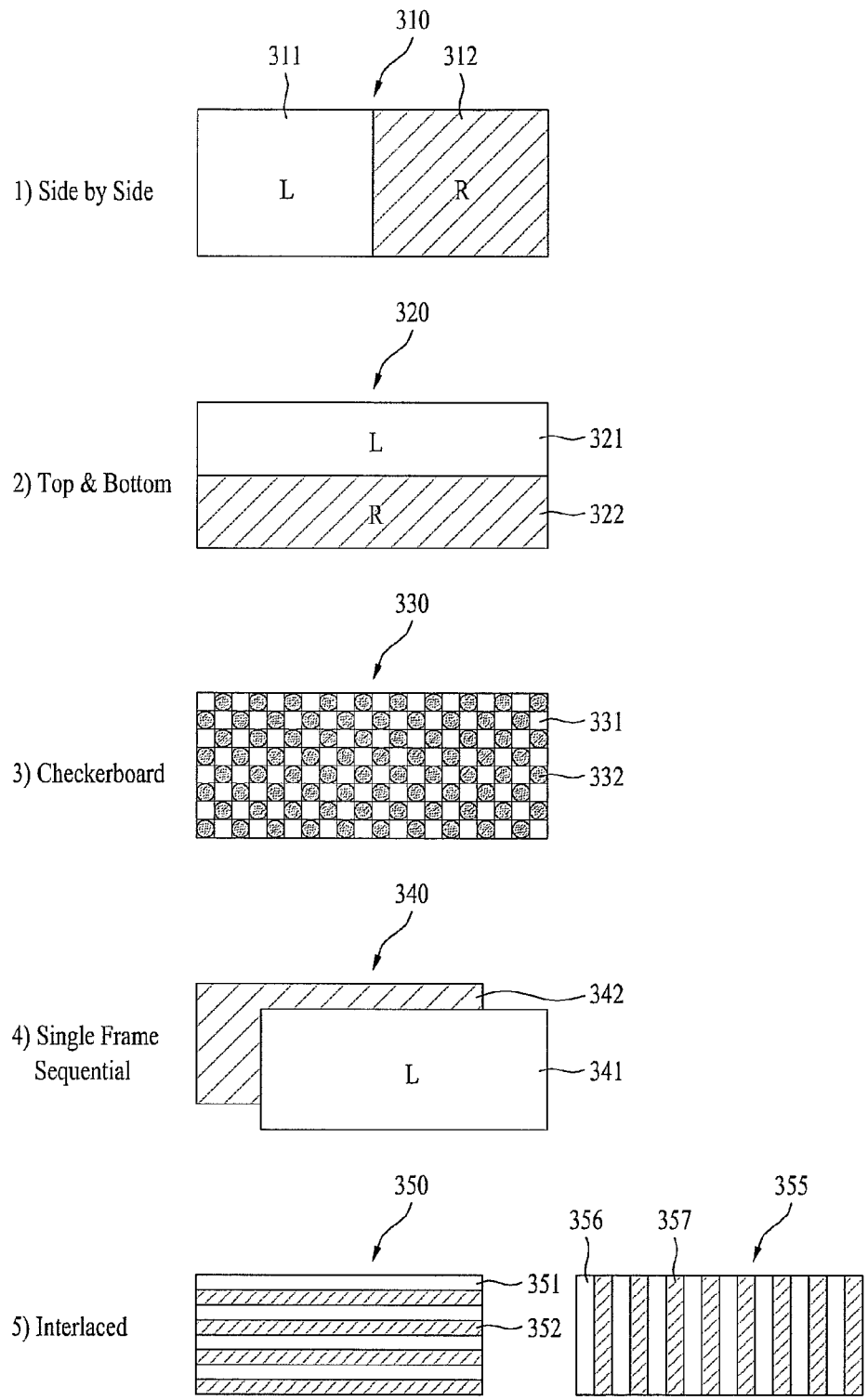
FIG. 3 is a diagram illustrating examples of a single video stream format of a 3D image according to the present invention.

FIG. 3 is a diagram illustrating examples of a single video stream format of a 3D image according to the present invention.

Referring to FIG. 3, a single video stream format may include a side-by-side format, a top and bottom format, a checkerboard format, a frame sequential format, and an interlaced format.

In the side-by-side format, left-view video data 311 displaying the left-view image 201 and right-view video data 312 displaying the right-view image 202 are input side by side so as to be orthogonal to the viewer's left eye and right eye, respectively. In a video frame 310 of the side-by-side format, one left-view video frame 311 and one right-view video frame 312 are arranged side by side.

In the top and bottom format, left-view video data 321 displaying the left-view image 201 and right-view video data 322 displaying the right-view image 202 are input above and below. In a video frame 320 of the top and bottom format, one left-view video frame 321 and one right-view video frame 322 are arranged above and below.

In the checkerboard format, left-view video data 331 displaying the left-view image 201 and right-view video data 322 displaying the right-view image 202 are alternately input in time in the shape of a checkerboard. In a video frame 330 of the checkerboard format, pixel data of the left-view image 201 and pixel data of the right-view image 202 are alternately arranged in time in the shape of a checkerboard.

In the frame sequential format, left-view video data 341 displaying the left-view image 201 and right-view video data 342 displaying the right-view image 202 are input with a time difference. In a video frame 340 of the frame sequential format, each of one left-view video frame 341 and one right-view video frame 342 is received as an individual image frame.

In a video frame 350 of the interlaced format, left-view video data displaying the left-view image 201 and right-view video data displaying the right-view image 202 are ½ sub-sampled in a horizontal direction and sampled left-view video data 351 and sampled right-view video data 352 are alternated line by line. In a video frame 355 of the interlaced format, left-view video data displaying the left-view image 201 and right-view video data displaying the right-view image 202 are ½ sub-sampled in a vertical direction and sampled left-view video data 356 and sampled right-view video data 357 are alternated line by line.

Figure 4:
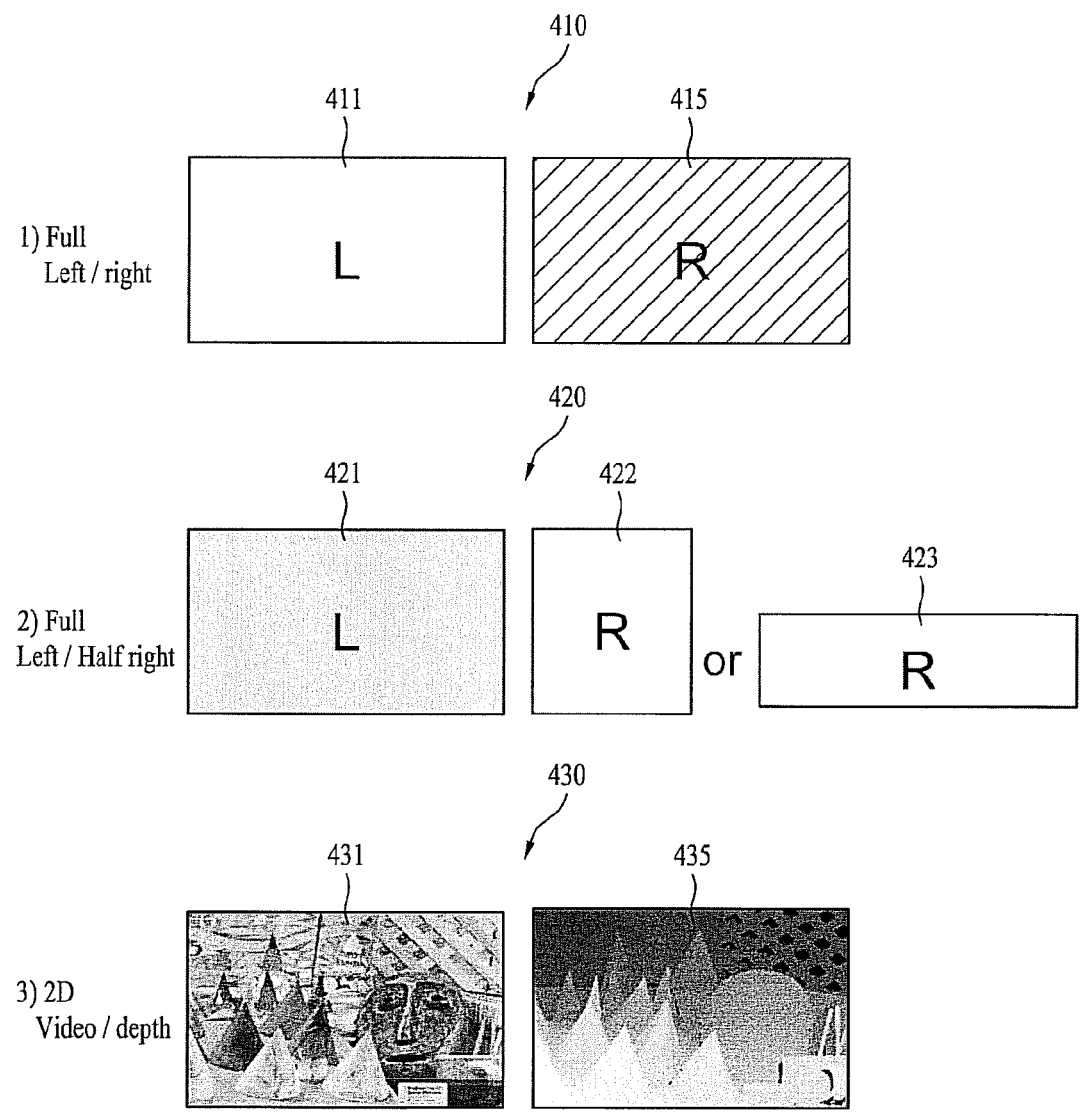
FIG. 4 is a diagram illustrating examples of a multi-video stream format of a 3D image according to the present invention.

FIG. 4 is a diagram illustrating a multi-video stream format of a 3D image according to the present invention.

Referring to FIG. 4, a multi-video stream format may include a full left/right format 410, a full left/half right format 420, and a 2D video/depth format 430.

In the full left/right format 410, a left-view image 411 and a right-view image 415 are sequentially transmitted. In the full left/half right format 420, a left-view image 421 is transmitted in an original state and a right-view image 422 or 423 is transmitting by performing ½ sub-sampling in a vertical or horizontal direction. In the 2D video/depth format 430, one viewpoint image 431, and depth information 435 for generating another one viewpoint image are transmitted together.

Referring back to FIG. 1, the receiver 101 may include a tuner 110, a demodulator 120, a mobile communication unit 115, a network interface 130, and an external signal receiver 135.

The tuner 110 selects a Radio Frequency (RF) broadcast signal corresponding to a channel selected by a user from among RF broadcast signals received through an antenna and converts the selected RF broadcast signal into an Intermediate Frequency (IF) signal or a baseband video or audio signal.

The demodulator 120 receives a Digital IF (DIF) signal converted by the tuner 110 and demodulates the DIF signal. For example, if the DIF signal generated from the tuner 110 is an ATSC signal, the demodulator 120 performs 8-Vestigial Side Band (VSB) demodulation. As another example, if the DIF signal generated from the tuner 110 is a DVB signal, the demodulator 120 performs Coded Orthogonal Frequency Division Multiple Access (COFDMA) demodulation.

The demodulator 120 may also perform channel decoding. For channel decoding, the demodulator 120 may include a Trellis decoder, a deinterleaver, and a Reed Solomon decoder to perform Trellis decoding, deinterleaving, and Reed Solomon decoding, respectively.

After performing demodulation and channel decoding, the demodulator 120 may output a Transport Stream (TS) signal. A video signal, an audio signal, or a data signal may be multiplexed in the TS signal. For example, the TS signal may be a Moving Picture Experts Group-2 (MPEG-2) TS in which an MPEG-2 video signal and a Dolby AC-3 audio signal are multiplexed. More specifically, the MPEG-2 TS may include a 4-byte header and a 184-byte payload.

The TS signal generated from the demodulator 120 may be provided to the signal processor 140.

The mobile communication unit 115 transmits and receives a radio signal to and from at least one of a base station, an external terminal, and a server in a mobile communication network. The radio signal may include an audio call signal, a video call signal, or various types of data for transmission and reception of text or multimedia messages.

The external signal receiver 135 may provide an interface which can connect the electronic device 100 to an external device. The external device may be a variety of types of video or audio output devices such as a Digital Versatile Disc (DVD) player, a Blu-ray player, a gaming device, a camcorder, and a computer (e.g., a notebook computer) and may be a storage device such as a Universal Serial Bus (USB) memory or a USB hard disk. The electronic device 100 may display video and audio signals received from the external signal receiver 135 and may store or use data signals.

The external device may also be an image capture device 90. The image capture device 90 may include a plurality of cameras. The image capture device 90 may capture an image of a human. The image capture device 90 may recognize, focus on, and capture a human hand shape by zooming in. The captured hand shape may be recognized as a spatial gesture. That is, the controller 190 may recognize the captured hand shape as a spatial gesture and may execute commands for performing operations associated with the recognized spatial gesture. The spatial gesture may be defined as a gesture recognized from a video frame or an image which is mapped to one or more specific computing operations and is received from the image capture device 90.

As a partial embodiment, the electronic device 100 may include the image capture device 90.

The signal processor 140 demultiplexes the TS signal generated from the demodulator 210, processes the demultiplexed signal, provides images to the display 150, and controls the audio output unit 160 to output sound 161. The signal processor 140 may receive image data, sound data, and broadcast data from the mobile communication unit 115, the network interface 130, and the external signal receiver 135.

The signal processor 140 may generate a video frame based on a left-view video frame and right-view video frame included in 3D video data received from the receiver 101. As a partial embodiment, the signal processor 140 may generate a first video frame and a second video frame based on the left-view video frame and the right-view video frame. Namely, the signal processor 140 may generate two video frames using one left-view video frame and one right-view video frame. The first video frame and the second video frame may form one 3D image.

As a partial embodiment, the signal processor 140 may change a frame rate of the 3D video data and may generate a first video frame and a second video frame based on a left-view video frame and a right-view video frame included in the 3D video data having the changed frame rate. Namely, the signal processor 140 may generate two video frames using left-view video data and right-view video data of one 3D video frame included in the 3D video data having the changed frame rate. The first video frame and the second video frame may form one 3D image.

Each of the first video frame and the second video frame may include pixel data of one of the left-view video frame and the right-view video frame in an odd line and may include pixel data of the other one in an even line. The first video frame and the second video frame may have the same resolution as a resolution of the left-view video data and may have a progressive resolution corresponding to the resolution of the left-view video data.

The signal processor 14 may provide the generated first video frame and second video frame to the display 150.

The display 150 displays an image 152. The image 152 may be a 3D image. The display 150 may display the 3D image in a patterned retarder type. The first video frame and the second video frame generated from the signal processor 140 may be displayed as the 3D image 152.

The display 150 may operate in conjunction with the controller 190. The display 150 may display a Graphical User Interface (GUI) 153 for providing an interface, which is easy to use, between a user and an Operating System (OS) of the electronic device 100 or between applications which are being executed on the OS. The GUI 153 expresses programs, files, and operation options as graphic images. The graphic images may include windows, fields, dialog boxes, menus, icons, buttons, cursors, and scroll bars. These images may be arranged in a predefined layout or may be dynamically generated to aid a specific action performed by a user. During operation, a user may select and activate images to perform functions and operations related to various graphics. For example, a user may select a button for opening, closing, minimizing, or maximizing a window or an icon for executing a specific program.

The audio output unit 160 may receive audio data from the signal processor 140 and the controller 190 and may output the sound 161 generated by displaying the received audio data.

The input unit 170 may be a touch screen which is arranged on the display 150 or at the front of the display 150. The touch screen may be integrated into the display 150 or may be a separate element. If the touch screen is arranged at the front of the display 150, a user may directly manipulate the GUI 153. For example, a user may place his or her finger on an object to be controlled. In a touch pad, however, a corresponding relationship as in the touch screen does not exist.

Generally, the touch pad is separately put on a different plane from the display 150. For example, the display 150 is generally located on a vertical plane and the touch pad is generally located on a horizontal plane. The touch pad is less intuitive and therefore is difficult to use as compared with the touch screen. In addition to the touch screen, the input unit 170 may be a multi-point input device.

The storage unit 180 stores program code and data used by the electronic device 100. The storage unit 180 may be implemented as a Read-Only Memory (ROM), a Random Access Memory (RAM), a hard disk drive, and the like. The program code and data may be stored in a separable storage medium and, if necessary, may be loaded or installed onto the electronic device 100. The separable storage medium may include a CD-ROM, PC card, a memory card, a floppy disk, a magnetic tape, and a network component.

The controller 190 executes a command and performs an operation related to the electronic device 100. For example, the controller 190 may control input and output between components of the electronic device 100 and data reception and processing, using a command detected from the storage unit 180. The controller 190 may be implemented as a single chip, a plurality of chips, or a plurality of electric components. For instance, various architectures including a dedicated or embedded processor, a single purpose processor, a controller, an Application-Specific Integrated Circuit (ASIC), etc. may be used as the controller 190.

The controller 190 executes computer code together with an OS and generates and uses data. The OS is generally known and therefore a detailed description thereof is not omitted. An example of the OS may include Windows OS, Unix, Linux, Palm OS, DOS, Android, and Mac OS. The OS, other computer code, and data may be present within the storage unit 180 which operates under control of the controller 190.

The controller 190 may recognize a user action and may control the electronic device 100 based on the recognized user action. The user action may include selection of a physical button of the electronic device 100 or a remote controller, execution of a prescribed gesture or selection of a soft button on a touch screen display, execution of a prescribed gesture recognized from an image captured through an image capture device, and production of prescribed sound recognized by voice recognition. The external signal receiver 135 may receive signals corresponding to a user action selected through a physical button of a remote controller.

Gestures may include touch gestures and spatial gestures. The touch gestures may be defined as a stylized interaction with the input unit 170, mapped to one or more computing operations. The touch gesture may be implemented through hand, more specifically, finger movement. As another alternative, gesture may be implemented through a stylus.

The input unit 170 receives a gesture 171, and the controller 190 executes commands for performing operations associated with the gesture 171. The storage unit 180 may include a gesture operation program 181 which may be a part of an OS or an additional application. The gesture operation program 181 includes a series of commands for recognizing the occurrence of the gesture 171 and informing one or more software agent of which actions should be taken in response to the gesture 171.

The controller 190 may determine or confirm a 3D image display mode. As a partial embodiment, the controller 190 may determine the 3D image display mode based on the recognized user action and may determine the 3D image display mode based on at least one of a resolution and a format of the received 3D video data. The controller 190 may determine the 3D image display mode based on the received broadcast information and may confirm the 3D image display mode based on stored 3D image display mode information.

The 3D image display mode may be one of a full image mode and a half image mode. The full image mode is a mode for displaying 3D video data at full resolution. The half image mode is a mode for displaying 3D video data by halving full resolution. The full resolution may be a full-HD resolution, one of highest supportable resolutions in a display device, or full resolution defined in video data transmission standard. For example, the full resolution may be full resolution defined as a mandatory format in High-Definition Multimedia Interface (HDMI) 1.4 standard. In the HDMI 1.4 standard, a 3D video format of full resolution is 1920×1080p×2@24 Hz and 1280×720p×2@60 Hz/50 Hz. As another example, the full resolution may be 720×480p@60 Hz, 1920×1080i×2@60 Hz, 1920×1080p×2@60 Hz, and 4K×2K×2@24 Hz (or 25 Hz or 30 Hz). Exceptionally, if 3D video data having a resolution of 1920×1080i×2 is input in a full video mode, the 3D video data may be displayed at a resolution of 1920×1080p×2. A resolution of 1920×1080p×2@60 Hz means that 3D video data includes a left-view video frame and a right-view video frame each having a resolution of 1920×1080p and a frame rate of 60 Hz. A resolution of 1280×720p×2@60 Hz/50 Hz means that 3D video data includes a left-view video frame having a resolution of 1280×720p and a frame rate of 60 Hz and a right-view video frame having a resolution of 1280×720p and a frame rate of 50 Hz.

The controller 190 may control the signal processor 140 to process 3D video data according to the determined or confirmed 3D image display mode. The signal processor 140 may process 3D video data in a full image mode by default.

The controller 190 may sense a user action for requesting a GUI to set a 3D image display mode. In response to the user action, the controller 190 may perform a control function to generate signals for displaying a screen including a region in which the GUI and image data are displayed. A 3D image may be displayed in the above region.

The controller 190 may control the signal processor 140 to process images displayed on the screen according to the 3D image display mode set through the GUI.

The controller 190 may control the storage unit 190 to store 3D image display mode information indicating the 3D image display mode set through the GUI.

Figure 5:
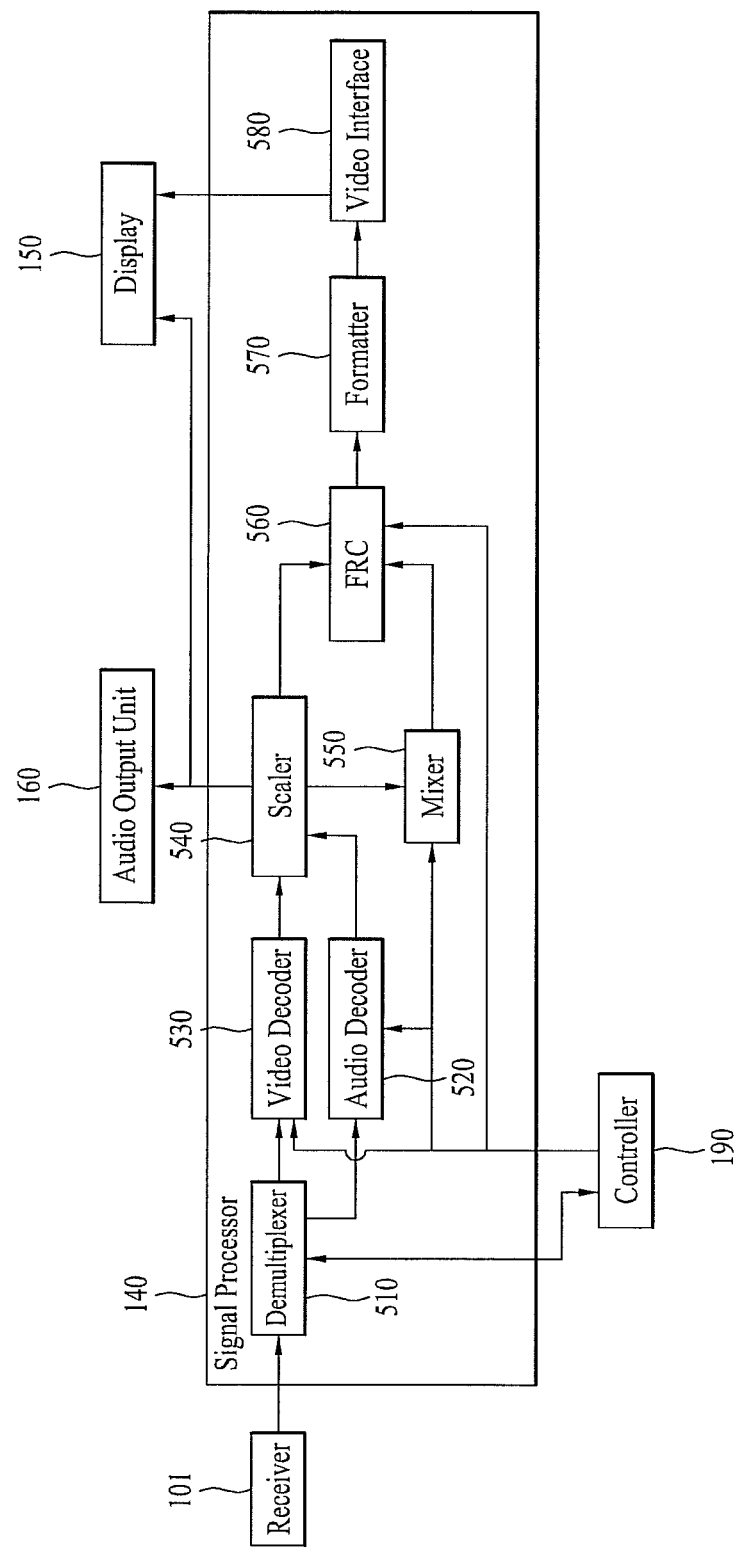
FIG. 5 is a block diagram illustrating a configuration of an exemplary embodiment of a signal processor according to the present invention.

FIG. 5 is a block diagram illustrating a configuration of an exemplary embodiment of a signal processor according to the present invention.

Referring to FIG. 5, the signal processor 140 may include a demultiplexer 510, an audio decoder 520, a video decoder 530, a scaler 540, a mixer 550, a Frame Rate Converter (FRC) 560, a formatter 570, and a video interface 580.

The demultiplexer 510 may receive a stream signal from the mobile communication unit 115, the network interface 130, and the external signal receiver 135 and may demultiplex the received stream signal to video data, audio data, and information data to provide the demultiplexed video data, audio data, and information data to the video decoder 530, the audio decoder 520, and the controller 190, respectively.

The audio decoder 520 may receive the audio data from the demultiplexer 510 and may restore the received audio data to provide the restored audio data to the scaler 540 or the audio output unit 160.

The video decoder 530 receives the video data from the demultiplexer 510 and restores the received video data to provide the restored video data to the scaler 540. The video data may include 3D video data.

The scaler 540 scales the video data and audio data processed by the video decoder 530, the controller 190, and the audio decoder 520 to signals having a proper magnitude to output the video and audio data through the display 150 or a speaker (not shown). More specifically, the scaler 540 receives a 3D image and scales the 3D image so as to be suitable for a resolution of the display 150 or a prescribed aspect ratio. The display 150 may be adapted to output an image having a predetermined resolution, for example, a 720×480, 1024×768, 1280×720, 1280×768, 1280×800, 1920×540, 1920×1080, and 4K×2K according to a product specification. Then the scaler 540 may convert the resolution of a 3D image having various resolutions to a resolution of a corresponding display.

The scaler 540 adjusts an aspect ratio of a 3D image according to a displayed content type or user setting. The aspect ratio may be 16:9, 4:3, or 3:2. The scaler 540 may adjust a ratio of a horizontal screen length versus a vertical screen length to a specific ratio.

The mixer 550 mixes outputs of the scaler 540 and the controller 190.

The FRC 560 may receive video data generated from the receiver 101, the scaler 540, or the mixer 550 and may process a frame rate of the received video data to correspond to a frame rate of the display 150. For example, if a frame rate of the received video data is 60 Hz and if a frame rate of the display 150 is 120 Hz or 240 Hz, the FRC 560 processes the frame rate of the video data by a predefined method so that the frame rate of the video data corresponds to the frame rate of the display 150 which is 120 Hz or 240 Hz. The predefined method includes a temporal interpolation method for performing temporal interpolation on input video data and a simple repetition method for simply repeating a video fame included in the input video data. The respective methods may be appropriately selected according to a format of the input 3D image and may be performed through the FRC 50.

The temporal interpolation method divides a 60 Hz input video signal into four equal parts (e.g. 0, 0.25, 0.5, and 0.75) so as to obtain a 240 Hz video signal. The simple repetition method repeats each frame of the 60 Hz input video signal four times so that a frequency of each frame becomes 240 Hz.

The FRC 560 may receive video data generated from the receiver 101, the scaler 540, or the mixer 550 and may process a frame rate of the received video data to correspond to half a frame rate of the display 150. For example, if a frame rate of the received video data is 60 Hz and if a frame rate of the display 150 is 120 Hz, the FRC 560 may bypass the video data to the formatter 670. If a frame rate of the received data is 60 Hz and if a frame rate of the display 150 is 240 Hz, the FRC 560 processes the frame rate of the video data to correspond to a frame rate of 120 Hz which is half the frame rate of the display 150 by a predefined method. If the frame rate of the received video data is 120 Hz and if the frame rate of the display 150 is 120 Hz, the FRC 560 may convert the frame rate of the video data to 60 Hz which is half the frame rate of the display 150.

The frame rate of the display 150 refers to a vertical scan frequency for displaying or generating the video frame configured by the formatter 570 through the display 150. Hereinafter, the frame rate of the display 150 is defined as an output frame rate or a display vertical frequency.

The following Table 1 shows embodiments in which the FRC 560 adjusts the frame rate according to a 3D video data type and an output frame rate.

L1/R1, L2/R2, L3/R3, and L4/R4 in the top and down format. Referring to (b) of FIG. 6, the video data of the top and down format is processed to have a frame rate of half a display vertical frequency through the FRC 560, thereby generating 120 Hz video data of the top and down format. That is, in FIG. 6(*b*), two L1/R1 frames, two L2/R2 frames, two L3/R3 frames, and two L4/R4 frames are present. Even though any one of the above-described video data conversion methods is used, the frames shown in FIG. 6(*b*) are obtained.

The formatter 570 samples 3D video data generated by the receiver 101 or the FRC 560 and provides the sampled data to the display 150.

Figure 7:
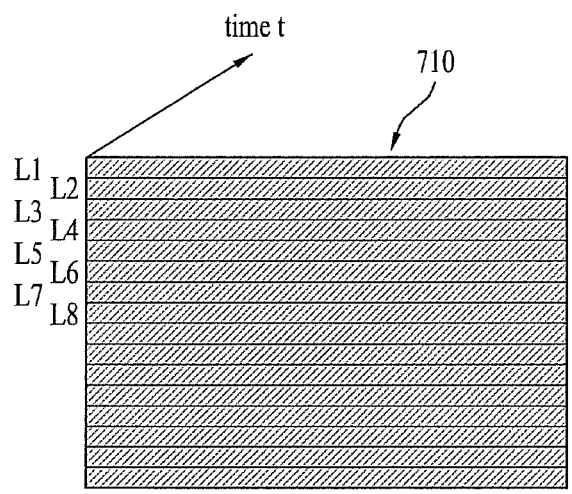
FIG. 7 is a diagram illustrating an exemplary embodiment of left-view video data and right-view video data input to a formatter.
Figure 7:
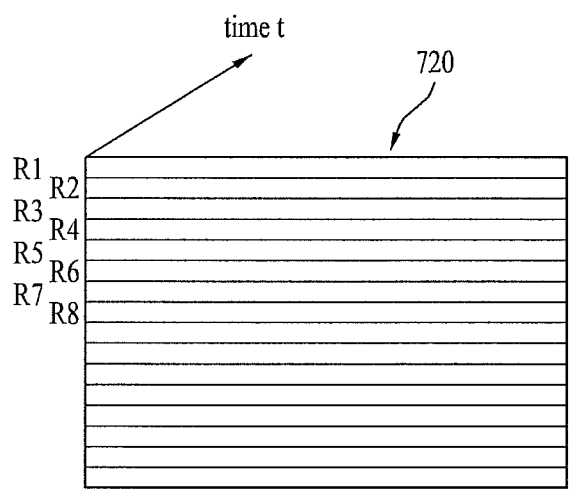

FIG. 7 is a diagram illustrating an exemplary embodiment of left-view video data and right-view video data input to a formatter.

Referring to FIG. 7, the formatter 570 may receive a left-view video frame 710 and a right-view video frame 720 from the receiver 101 or the FRC 560. The formatter 570 may generate a first video frame and a second video frame using the left-view video frame 710 and the right-view video frame 720. A resolution of each of the left-view video frame 710 and the right-view video frame 720 may be one of 720×480p, 1280×720p, 1920×1080i, 1920×1080p, and 4K×2K. If a 3D image display mode is a full image mode, the formatter 570 may generate the first video frame and the second video frame using the left-view video frame 710 and the right-view video frame 720. The formatter 570 may provide the generated first video frame and second video frame to the video interface 580. The left-view video frame 710 and the right-view video frame 720 form one 3D image.

TABLE 1

| 3D format | Size of received video frame | Received video frame rate | Converted frame rate at output frame rate of 120 Hz | Converted frame rate at output frame rate of 240 Hz |
|---|---|---|---|---|
| Side-by-Side | 1920 × 1080 4K × 2K | Maximum of 60 Hz in each of left-view and right-view video frames | 60 Hz in each of left-view and right-view video frames | 120 Hz in each of left-view and right-view video frames |
| Frame Sequential | 1920 × 1080 4K × 2K | Maximum of 30 Hz in each of left-view and right-view video frames | 60 Hz in each of left-view and right-view video frames | 120 Hz in each of left-view and right-view video frames |
| Frame Packing Dual Fame | 1920 × 1080P 1280 × 720P 1920 × 1080i 4K × 2K | 24 Hz, 25 Hz, 30 Hz, and 60 Hz in each of left-view and right-view video frames | 60 Hz in each of left-view and right-view video frames | 120 Hz in each of left-view and right-view video frames |

Figure 6:
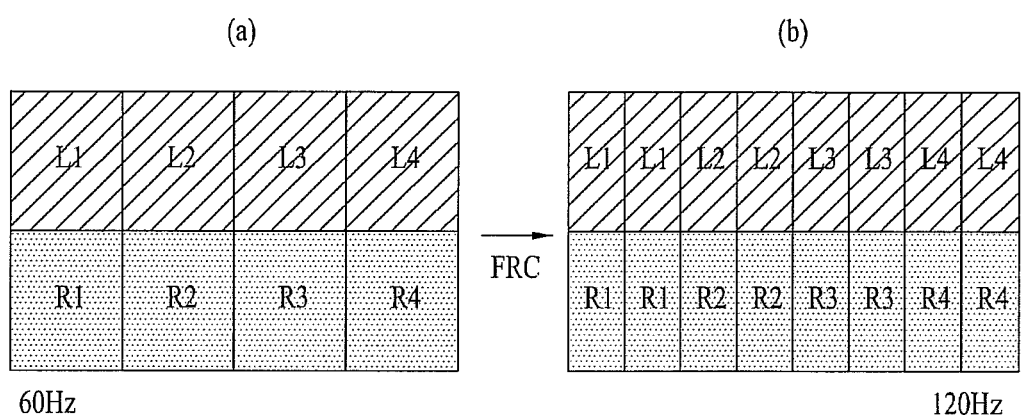
FIG. 6 is a diagram illustrating a 3D video data processing process in an FRC.

FIG. 6 is a diagram illustrating a 3D video data processing process in an FRC.

Referring to FIG. 6, (a) of FIG. 6 shows video data of a specific frequency (e.g. 60 Hz) input to the FRC 560 and (b) FIG. 6 shows video data, a frame rate of which is converted to half of a display vertical frequency (e.g. 240 Hz) through the FRC 560. For convenience of description, 3D video data of a top and down format is shown by way of example. However, the present invention is not limited thereto and all the formats described with reference to FIGS. 3 and 4 may be applied.

Referring to (a) of FIG. 6, 60 Hz video data of a top and down format input to the FRC 560 includes four frames The formatter 570 may receive a next left-view video frame of the left-view video frame 710 and a next right-view video frame of the right-view video frame 720 from the receiver 101 or the FRC 560 and may generate a first video frame and a second video frame using the received next left-view video frame and the received next right-view video frame. The left-view video frame and the right-view video frame may be received at a time interval corresponding to a frame rate of a corresponding video frame.

In FIG. 7, L indicates pixel data included in the left-view video frame 710 and R indicates pixel data included in the right-view video frame 720. A numeral after L or R indicates a line number of a video frame. Namely, L1 denotes a first line of the left-view video frame 710, L2 denotes a second line of the left-view video frame 710, L3 denotes a third line of the left-view video frame 710, R1 denotes a first line of the right-view video frame 720, R2 denotes a second line of the right-view video frame 720, and R3 denotes a third line of the right-view video frame 720.

In the case where the left-view video frame 710 and the right-view video frame 720 are interlaced, if the line number is an odd number, it indicates a line of an odd field, and if the line number is an even number, it indicates a line of an even field. L1 denotes a first line of an odd field of the left-view video frame 710, L3 denotes a second line of the odd field, and L5 denotes a third line of the odd field. Similarly, L2 denotes a first line of an even line of the left-view video frame 710, L4 denotes a second line of the even field, and L6 denotes a third line of the even field.

FIG. 8 is a diagram illustrating a configuration of a first embodiment of pixel data of a first video frame and a second video frame generated by the electronic device according to the present invention.

Referring to FIG. 8, the formatter 570 may generate a video frame 810 as a first video frame and generate a video frame 820 as a second video frame. A first line of the video frame 810 includes pixel data L1 of a first line of the left-view video frame 710, and a first line of the video frame 820 includes pixel data L2 of a second line of the left-view video frame 710.

A second line of the video frame 810 includes pixel data R1 of a first line of the right-view video frame 720, a third line of the video frame 810 includes pixel data L3 of a third line of the left-view video frame 710, a fourth line of the video frame 810 includes pixel data R3 of a third line of the right-view video frame 720, and a fifth line of the video frame 810 includes pixel data L5 of a fifth line of the left-view video frame 710. Namely, pixel data of each odd line of the left-view video frame 710 is included in each odd line of the video frame 810, and pixel data of each odd line of the right-view video frame 720 is included in each even line of the video frame 810.

A second line of the video frame 820 includes pixel data R2 of a second line of the right-view video frame 720, a third line of the video frame 820 includes pixel data L4 of a fourth line of the left-view video frame 710, a fourth line of the video frame 820 includes pixel data R4 of a fourth line of the right-view video frame 720, and a fifth line of the video frame 820 includes pixel data L6 of a sixth line of the left-view video frame 710. Namely, pixel data of each even line of the left-view video frame 710 is included in each odd line of the video frame 820, and pixel data of each even line of the right-view video frame 720 is included in each even line of the video frame 820.

According to a polarized order of left eye and right eye video lines of the display 150, odd lines of the video frame 810 and the video frame 820 may include left-view video data, and even lines thereof may include right-view video data as shown in FIG. 8. On the contrary, odd lines of the video frame 810 and the video frame 820 may include right-view video data, and even lines thereof may include left-view video data. Hereinafter, pixel data included in odd lines of a video frame is defined as odd line data, and pixel data included in even lines of a video frame is defined as even line data.

FIG. 9 is a diagram illustrating a configuration of a second embodiment of pixel data of a first video frame and a second video frame generated by the electronic device according to the present invention.

Referring to FIG. 9, the formatter 570 may generate a video frame 910 as a first video frame and may generate a video frame 920 as a second video frame.

Odd line data of the left-view video frame 710 is included in each odd line of the video frame 910, and even line data of the right-view video frame 720 is included in each even line of the video frame 910.

Even line data of the left-view video frame 710 is included in each odd line of the video frame 920, and odd line data of the right-view video frame 720 is included in each even line of the video frame 920.

According to a polarized order of left eye and right eye video lines of the display 150, odd lines of the video frame 910 and the video frame 920 may include left-view video data, and even lines thereof may include right-view video data as shown in FIG. 9. On the contrary, odd lines of the video frame 910 and the video frame 920 may include right-view video data, and even lines thereof may include left-view video data.

Figure 10:
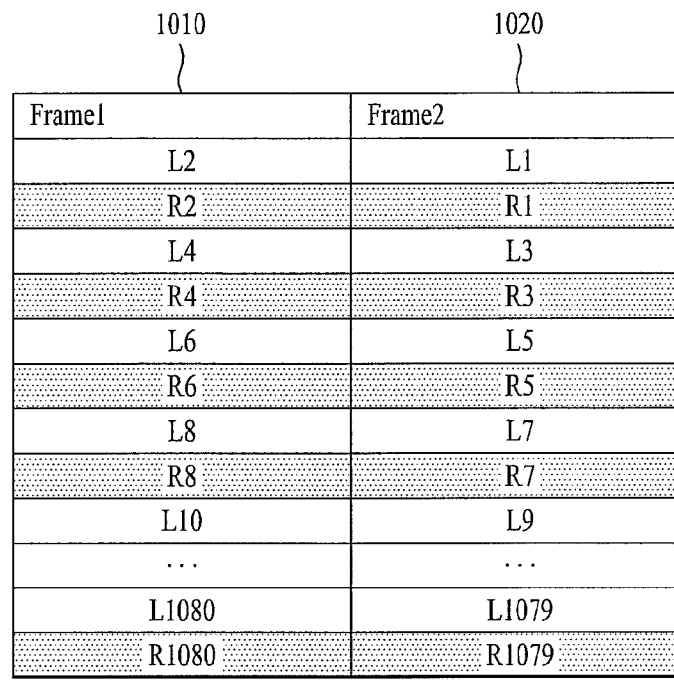
FIG. 10 is a diagram illustrating a configuration of a third embodiment of pixel data of a first video frame and a second video frame generated by the electronic device according to the present invention.

FIG. 10 is a diagram illustrating a configuration of a third embodiment of pixel data of a first video frame and a second video frame generated by the electronic device according to the present invention.

Referring to FIG. 10, the formatter 570 may generate a video frame 1010 as a first video frame and may generate a video frame 1020 as a second video frame.

Even line data of the left-view video frame 710 is included in each odd line of the video frame 1010, and even line data of the right-view video frame 720 is included in each even line of the video frame 1010.

Odd line data of the left-view video frame 710 is included in each odd line of the video frame 1020, and odd line data of the right-view video frame 720 is included in each even line of the video frame 1020.

According to a polarized order of left eye and right eye video lines of the display 150, odd lines of the video frame 1010 and the video frame 1020 may include left-view video data, and even lines thereof may include right-view video data as shown in FIG. 10. On the contrary, odd lines of the video frame 1010 and the video frame 1020 may include right-view video data, and even lines thereof may include left-view video data.

Figure 11:
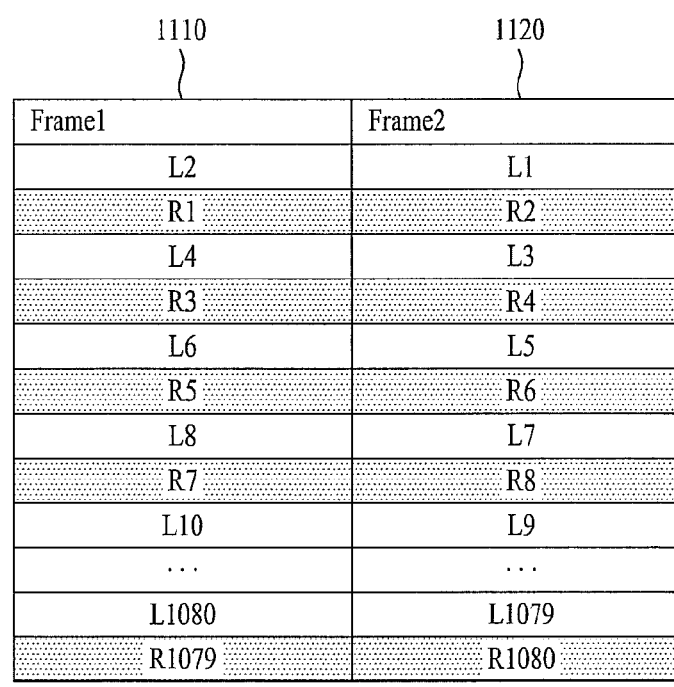
FIG. 11 is a diagram illustrating a configuration of a fourth embodiment of pixel data of a first video frame and a second video frame generated by the electronic device according to the present invention.

FIG. 11 is a diagram illustrating a configuration of a fourth embodiment of pixel data of a first video frame and a second video frame generated by the electronic device according to the present invention.

Referring to FIG. 11, the formatter 570 may generate a video frame 1110 as a first video frame and may generate a video frame 1120 as a second video frame.

Even line data of the left-view video frame 710 is included in each odd line of the video frame 1110, and odd line data of the right-view video frame 720 is included in each even line of the video frame 1110.

Odd line data of the left-view video frame 710 is included in each odd line of the video frame 1120, and even line data of the right-view video frame 720 is included in each even line of the video frame 1120.

According to a polarized order of left eye and right eye video lines of the display 150, odd lines of the video frame 1110 and the video frame 1120 may include left-view video data, and even lines thereof may include right-view video data as shown in FIG. 11. On the contrary, odd lines of the video frame 1110 and the video frame 1120 may include right-view video data, and even lines thereof may include left-view video data.

Figure 12:
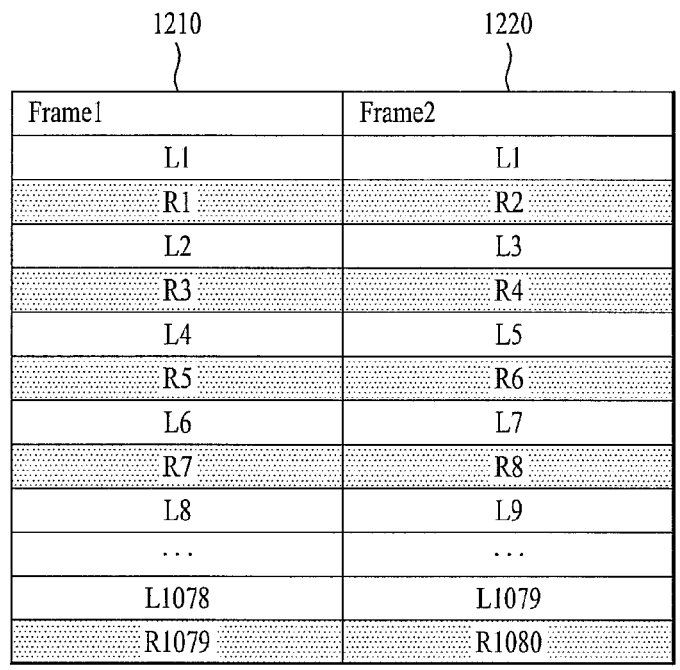
FIG. 12 is a diagram illustrating a configuration of a fifth embodiment of pixel data of a first video frame and a second video frame generated by the electronic device according to the present invention.

FIG. 12 is a diagram illustrating a configuration of a fifth embodiment of pixel data of a first video frame and a second video frame generated by the electronic device according to the present invention.

Referring to FIG. 12, the formatter 570 may generate a video frame 1210 as a first video frame and generate a video frame 1220 as a second video frame. A first line of the video frame 1210 and the video frame 1220 includes pixel data of a first line of the left-view video frame. That is, pixel data L1 included in the first line of the video frame 1210 is equal to pixel data L1 included in the first line of the video frame 1220.

A second line of the video frame 1210 includes pixel data R1 of a first line of the right-view video frame 720, a third line of the video frame 1210 includes pixel data L2 of a second line of the left-view video frame 710, a fourth line of the video frame 1210 includes pixel data R3 of a third line of the right-view video frame 720, and a fifth line of the video frame 1210 includes pixel data L4 of a fourth line of the left-view video frame 710. Namely, left-view video data is included in each odd line of the video frame 1210, and right-view video data is included in each even line of the video frame 1210. Moreover, odd line data of the right-view video frame 720 is included in each even line of the video frame 1210. Even line data of the left-view video frame 710 is included in each odd line, except for the first line, of the video frame 1210.

A second line of the video frame 1220 includes pixel data R2 of a second line of the right-view video frame 720, a third line of the video frame 1220 includes pixel data L3 of a third line of the left-view video frame 710, a fourth line of the video frame 1220 includes pixel data R4 of a fourth line of the right-view video frame 720, and a fifth line of the video frame 1220 includes pixel data L5 of a fifth line of the left-view video frame 710. Namely, left-view video data is included in each odd line of the video frame 1220, and right-view video data is included in each even line of the video frame 1220. Moreover, odd line data of the left-view video frame 710 is included in each odd line of the video frame 1220, and even line data of the right-view video frame 720 is included in each even line of the video frame 1220.

According to a polarized order of left eye and right eye video lines of the display 150, odd lines of the video frame 1210 and the video frame 1220 may include left-view video data, and even lines thereof may include right-view video data as shown in FIG. 12. On the contrary, odd lines of the video frame 1210 and the video frame 1220 may include right-view video data, and even lines thereof may include left-view video data. In this case, in FIG. 12, L and R are interchanged and numerals after L and R remain the same.

Figure 13:
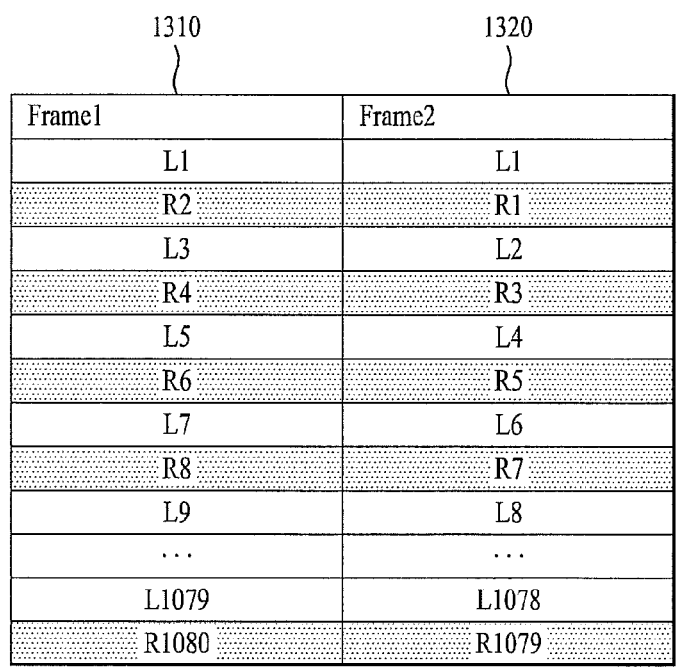
FIG. 13 is a diagram illustrating a configuration of a sixth embodiment of pixel data of a first video frame and a second video frame generated by the electronic device according to the present invention.

FIG. 13 is a diagram illustrating a configuration of a sixth embodiment of pixel data of a first video frame and a second video frame generated by the electronic device according to the present invention.

Referring to FIG. 13, the formatter 570 may generate a video frame 1310 as a first video frame and generate a video frame 1320 as a second video frame. A first line of the video frame 1310 and the video frame 1320 includes pixel data of a first line of the left-view video frame. That is, pixel data L1 included in the first line of the video frame 1310 is equal to pixel data L1 included in the first line of the video frame 1320.

A second line of the video frame 1310 includes pixel data R2 of a second line of the right-view video frame 720, a third line of the video frame 1310 includes pixel data L3 of a third line of the left-view video frame 710, a fourth line of the video frame 1310 includes pixel data R4 of a fourth line of the right-view video frame 720, and a fifth line of the video frame 1310 includes pixel data L5 of a fifth line of the left-view video frame 710. Namely, left-view video data is included in each odd line of the video frame 1310, and right-view video data is included in each even line of the video frame 1310. Moreover, even line data of the right-view video frame 720 is included in each even line of the video frame 1310. Odd line data of the left-view video frame 710 is included in each odd line of the video frame 1310.

A second line of the video frame 1320 includes pixel data R1 of a first line of the right-view video frame 720, a third line of the video frame 1320 includes pixel data L2 of a second line of the left-view video frame 710, a fourth line of the video frame 1220 includes pixel data R3 of a third line of the right-view video frame 720, and a fifth line of the video frame 1320 includes pixel data L4 of a fourth line of the left-view video frame 710. Namely, even line data of the left-view video frame 710 is included in each odd line, except for the first line, of the video frame 1320, and odd line data of the right-view video frame 720 is included in each even line of the video frame 1320.

According to a polarized order of left eye and right eye video lines of the display 150, odd lines of the video frame 1310 and the video frame 1320 may include left-view video data, and even lines thereof may include right-view video data as shown in FIG. 13. On the contrary, odd lines of the video frame 1310 and the video frame 1320 may include right-view video data, and even lines thereof may include left-view video data. In this case, in FIG. 13, L and R are interchanged and numerals after L and R remain the same.

Figure 14:
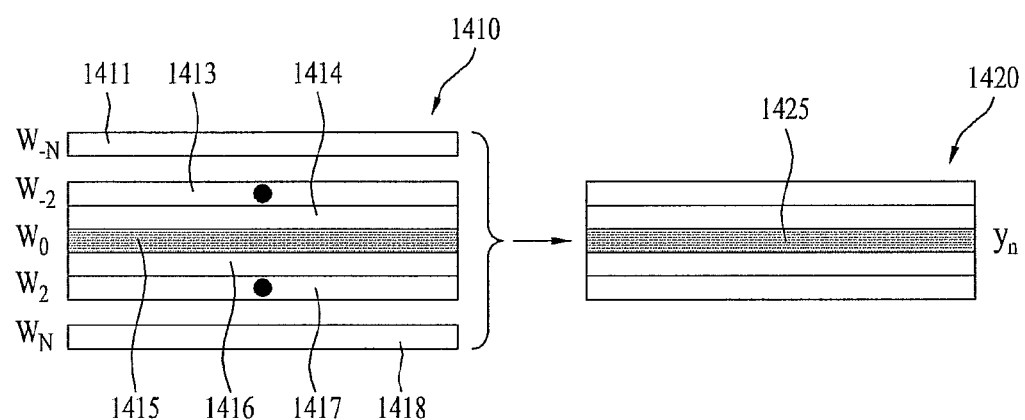
FIG. 14 is a diagram explaining vertical filtering.

FIG. 14 is a diagram explaining vertical filtering.

Referring to FIG. 14, the formatter 570 may perform vertical filtering on odd line data or even line data of the left-view video frame 710 and the right-view video frame 720.

Upon generating a first video frame and a second video frame, the formatter 570 may not perform filtering using information of neighboring lines and may configure the first video frame and the second video frame by simply extracting odd line data and even line data from the left-view video frame 710 and the right-view video frame 720.

Upon generating the first video frame and the second video frame, the formatter 570 may perform vertical filtering on odd line data and even line data of the left-view video frame 710 and the right-view video frame 720 using information of neighboring lines and may configure the first video frame and the second video frame using the filtered odd line data and the filtered even line data.

The following Equation 1 show vertical filtering:

$$\tilde{I}(x, y) = \frac{\sum_{k=-N}^{N} w_k \cdot I(x, y+k)}{\sum_{k=-N}^{N} w_k}$$ [Equation 1]

In Equation 1, $y_n$ denotes a Y-axis coordinate value of a current central line 1415, $I(x, y_n+k)$ denotes a pixel value at each X-axis value in a line separated by K from the current central line 1415, $w_k$ denotes a filter coefficient of a K-th line, $\tilde{I}(x,y)$ denotes a filtered pixel value, and N denotes the number of upper or lower neighboring lines which are to be subjected to filtering. Here, N may be a preset value, a value set by a user, or a value which is set according to at least one of resolution and line location.

A video frame 1410 may be one of the left eye video frame 710 and the right eye video frame 720. A filter coefficient of the central line 1415 in the video frame 1410 is $W_0$, filter coefficients of lines 1414, 1413, and 1411 are $W_{-1}$, $W_{-2}$ and $W_{-n}$, respectively, and filter coefficients of lines 1416, 1417, and 1418 are $W_1$, $W_2$, and $W_n$, respectively.

A video frame 1420 may be one of a first video frame or a second video frame including a line 1425 generated by filtering the central line 1415. The formatter 570 may perform filtering defined in Equation 1 on each odd line data and each even line data of the video frame 1410, thereby calculating filtered odd line data and filtered even line data.

If $w_k = w_{-k}$ for all K, this means that filtering is performed by assigning a weight symmetrically up and down based on the central line 1415, and if not, this means that filtering is performed by assigning a weight asymmetrically up and down. If filtering is not performed, it is the same as the case where $w_0 < 1$, $w_{k,k=0} = 0$, that is, only a weight of the central line 141 is 1 and weights of the other lines are 0.

The video interface 580 may provide the first video frame and second video frame generated by the formatter 570 to the display 150. The video interface 580 may be a Low Voltage Differential Signaling (LVDS) transmit (Tx) output interface.

Figure 15:
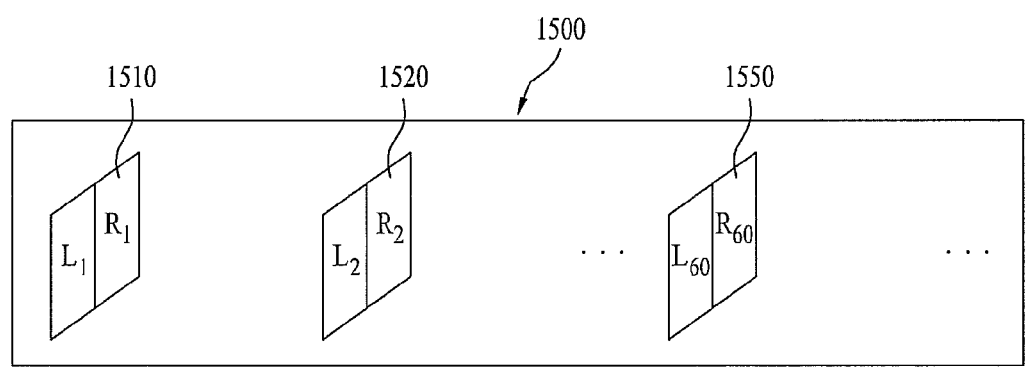
FIG. 15 is a diagram illustrating an exemplary embodiment of 60 Hz input 3D video data of a side-by-side format.
Figure 16:
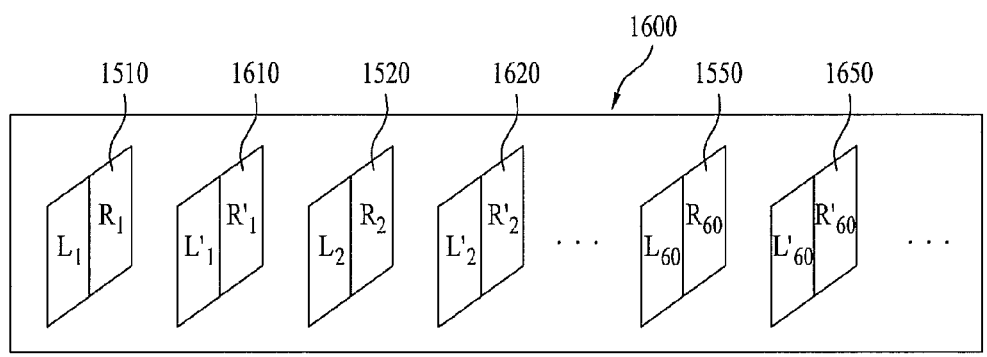
FIG. 16 is a diagram illustrating an exemplary embodiment of 3D video data 6 shown in FIG. 15, a frame rate of which is adjusted.
Figure 17:
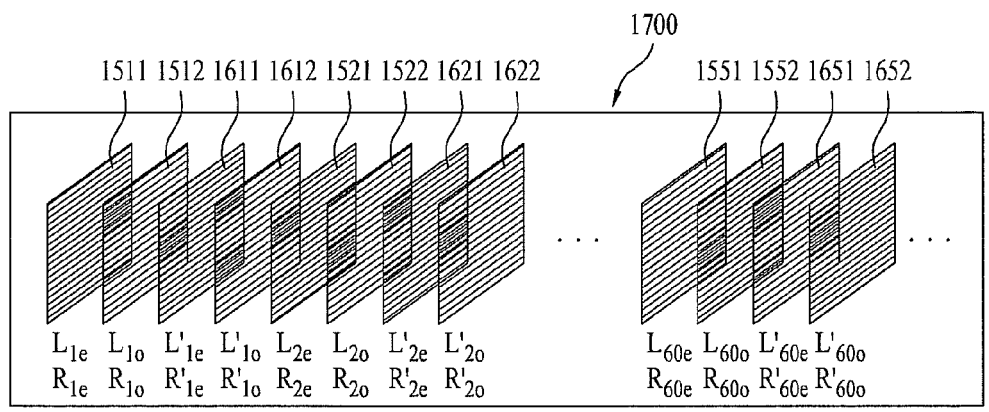
FIG. 17 is a diagram illustrating an exemplary embodiment of generation of a first video frame and a second video frame using the 3D video data shown in FIG. 16.

FIG. 15 is a diagram illustrating an exemplary embodiment of 60 Hz input 3D video data of a side-by-side format. FIG. 16 is a diagram illustrating an exemplary embodiment of 3D video data shown in FIG. 15, a frame rate of which is adjusted. FIG. 17 is a diagram illustrating an exemplary embodiment of generation of a first video frame and a second video frame using the 3D video data shown in FIG. 16.

Referring to FIGS. 15 to 17, the FRC 560 may receive 3D video data 1500 in a side-by-side format, a frame rate of which is 60 Hz. The 3D video data 1500 includes a 3D video frame 1510, a 3D video frame 1520, and a 3D video frame 1550. The 3D video frame 1510 includes left-view video data L1 and right-view video data R1, the 3D video frame 1520 includes left-view video data L2 and right-view video data R2, and the 3D video frame 1550 includes left-view video data L60 and right-view video data R60.

If an output frame rate is 240 Hz, the FRC 560 may generate 3D video frames while converting a frame rate of the 3D video data 1500 to 120 Hz and may insert the generated 3D video frames between the 3D video frames of the 3D video data 1500. That is, the FRC 560 generates a 3D video frame 1610, a 3D video frame 1620, and a 3D video frame 1650. The 3D video frames 1610, 1620, and 1650 may be generated by the method described with reference to FIG. 6. The FRC 560 inserts the 3D video frame 1610 between the 3D video frame 1510 and the 3D video frame 1520, inserts the 3D video frame 1620 after the 3D video frame 1520, and inserts the 3D video frame 1650 after the 3D video frame 1550, thereby converting the 3D video data 1500 into 3D video data 1600.

The FRC 560 provides 3D video data 1600, a frame rate of which is 120 Hz, to the formatter 570. The FRC 560 may generate the 3D video frame 1620 and simultaneously sequentially generate the 3D video frames 1510, 1610, and 1520 located prior to the 3D video frame 1620.

The formatter 570 generates first video frames and second video frames based on the 3D video frames included in the 3D video data 1600 generated by the FRC 560. The generated first video frames and second video frames may be the first video frames and second video frames shown in FIGS. 8 to 13.

The formatter 570 generates a first video frame 1511 and a second video frame 1512 using the 3D video frame 1510. The formatter 570 generates a first video frame 1611 and a second video frame 1612 using the 3D video frame 1610. The formatter 570 generates a first video frame 1521 and second video frame 1522 using the 3D video frame 1520.

The formatter 570 generates a first video frame 1621 and a second video frame 1622 using the 3D video frame 1620.

Upon receiving the 3D video frame 1550, the formatter 570 generates a first video frame 1551 and a second video frame 1552. Next, the formatter 570 generates a first video frame 1651 and a second video frame 1652 using the 3D video frame 1650.

Figure 18:
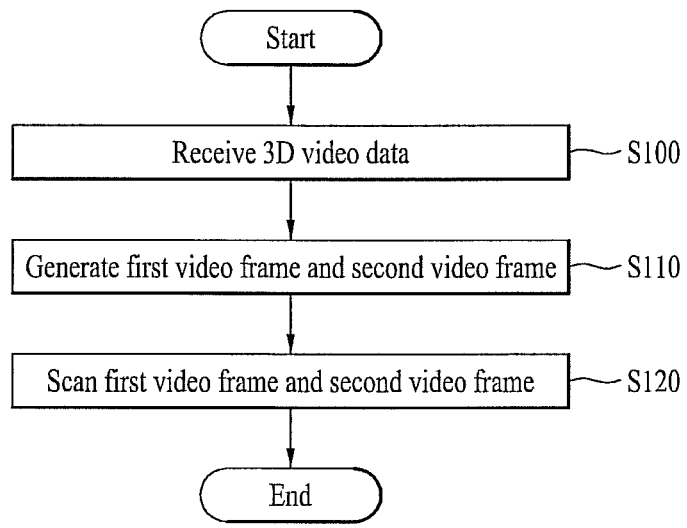
FIG. 18 is a flowchart illustrating an exemplary embodiment of a 3D image display process according to the present invention.

FIG. 18 is a flowchart illustrating an exemplary embodiment of a 3D image display process according to the present invention.

Referring to FIG. 18, the formatter 570 receives 3D video data (step S100). The 3D video data may be generated from the receiver 101, the scaler 540, the mixer 550, and the FRC 560 or may have the formats described in conjunction with FIGS. 3 and 4. The formatter 570 may sequentially receive 3D video frames included in the 3D video data. The 3D video frames may include the left-view video frame 710 and right-view video frame 710 shown in FIG. 7.

The formatter 570 generates a first video frame and a second video frame using the received 3D video data (step S110). The first video frame and the second video frame may be the first video frame and second video frame described in conjunction with each of FIGS. 8 to 15. According to the method described with reference to FIGS. 16 and 17, the formatter 570 may generate the first video frame and the second video frame using one 3D video frame.

The display 150 scans the first video frame and the second video frame generated by formatter 570 (step S120). The display 150 may scan the first video frame and the second video frame according to an output frame rate.

Figure 19:
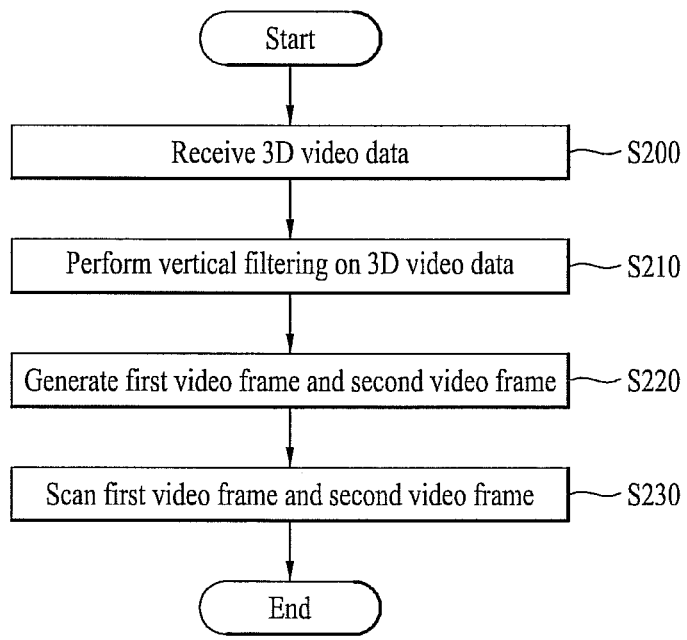
FIG. 19 is a flowchart illustrating another exemplary embodiment of a 3D image display process according to the present invention.

FIG. 19 is a flowchart illustrating another exemplary embodiment of a 3D image display process according to the present invention.

Referring to FIG. 19, the formatter 570 receives 3D video data (step S200). The 3D video data may be generated from the receiver 101, the scaler 540, the mixer 550, and the FRC 560 or may have the formats described in conjunction with FIGS. 3 and 4. The formatter 570 may sequentially receive 3D video frames included in the 3D video data. The 3D video frames may include the left-view video frame 710 and right-view video frame 720 shown in FIG. 7.

The formatter 570 performs vertical filtering on the received 3D video data (step S210). The formatter 570 may perform vertical filtering on odd line data and even line data of the 3D video frames included in the received 3D video data. The formatter 570 may perform vertical filtering according to Equation 1.

The formatter 570 generates a first video frame and a second video frame using the vertically filtered 3D video data (step S220). The first video frame and the second video frame may be the first video frame and the second video frame shown in each of FIGS. 8 to 13. According to the method described in conjunction with FIGS. 16 and 17, the formatter 570 may generate the first video frame and the second video frame using one 3D video frame.

The display 150 scans the first video frame and second video frame generated by the formatter 570 (step S230). The display 150 may scan the first video frame and the second video frame according to an output frame rate.

Figure 20:
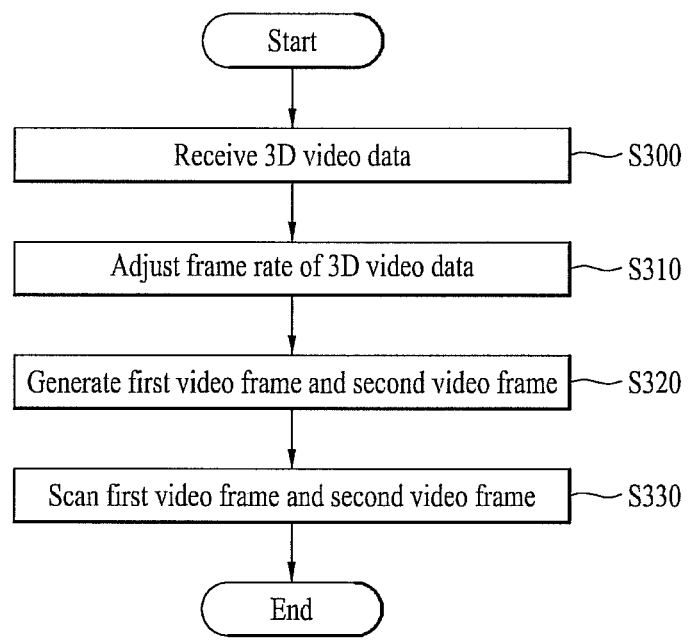
FIG. 20 is a flowchart illustrating a further exemplary embodiment of a 3D image display process according to the present invention.

FIG. 20 is a flowchart illustrating a further exemplary embodiment of a 3D image display process according to the present invention.

Referring to FIG. 20, the FRC 560 receives 3D video data (step S300). The 3D video data may be generated from the receiver 101, the scaler 540, and the mixer 550 or may have the formats described in conjunction with FIGS. 3 and 4.

The FRC 560 adjusts a frame rate of the received 3D video data (step S310). The FRC 560 may convert the frame rate of the 3D video data to half an output frame rate. Namely, the FRC 560 may adjust the frame rate of the 3D video data according to the example shown in Table 1. The FRC 560 may also adjust the frame rate by the method shown in FIG. 6. The FRC 560 may generate 3D video frames according to the method shown in FIGS. 15 and 16 and may adjust the frame rate by inserting the generated 3D video frames into the 3D video data.

The formatter 570 generates a first video frame and a second video frame using the 3D video data, frame rates of which are adjusted (step S320). The formatter 570 may sequentially receive 3D video frames included in the 3D video data from the FRC 560. The 3D video frames may include the left-view video frame 710 and the right-view video frame 720 shown in FIG. 7.

The first video frame and the second video frame may be the first video frame and the second video frame shown in each of FIGS. 8 to 13. According to the method shown in FIGS. 16 and 17, the formatter 570 may generate the first video frame and the second video frame using one 3D video frame.

The formatter 570 may perform vertical filtering on the 3D video data and may generate the first video frame and the second video frame using the vertically filtered 3D video data.

The display 150 scans the first video frame and the second video frame generated by the formatter 570 (step S330). The display 150 may scan the first video frame and the second video frame according to an output frame rate.

The present invention may be implemented as code that can be written on a computer-readable recording medium and can thus be read by a computer. The computer-readable recording medium includes all types of recording devices in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer devices connected through a network so that computer-readable code is written thereto and executed therefrom in a decentralized manner.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A 3-Dimensional (3D) image display method comprising:
   receiving 3D video data including a plurality of left-view video data and a plurality of right-view video data;
   changing a frame rate of the received 3D video data;
   generating a first video frame and a second video frame based on the plurality of left-view video data and the plurality of right-view video data included in the 3D video data having the changed frame rate; and
   outputting the first video frame and the second video frame,
   wherein a left-view video frame includes the plurality of left-view video data having a first odd line data (L1, L3, L5, L7) and a first even line data (L2, L4, L6, L8),
   wherein a right-view video frame includes the plurality of right-view video data having a second odd line data (R1, R3, R5, R7) and a second even line data (R2, R4, R6, R8),
   wherein the odd line of the first video frame is a fixed one of the first odd line data (L1, L3, L5, L7, L9),
   the even line of the first video frame is changed from one of the second odd line data (R1, R3, R5, R7) to one of the second even line data (R2, R4, R6, R8),
   the odd line of the second video frame is a fixed one of the first even line data (L2, L4, L6, L8, L10), and
   the even line of the second video frame is changed from one of the second even line data (R2, R4, R6, R8) to one of the second odd line data (R1, R3, R5, R7),
   wherein the first video frame and the second video frame are generated in an order of receiving the left-view video frame and the right-view video frame, and
   the left-view video frame and the right-view video frame are received at a time interval corresponding to the frame rate of a corresponding video frame.

2. The 3D image display method of claim 1, wherein the generation of the first video frame and the second video frame includes performing vertical filtering on the plurality of left-view video data and the plurality of right-view video data.

3. The 3D image display method of claim 2, wherein a resolution of each of the left-view video data and the right-view video data is one of 720×480p, 1280×720p, 1920×1080i, 1920×1080p and 4K×2K,
   when the resolution is 720×480p, then the first video frame and the second video frame have a resolution of 720×480p,
   when the resolution is 1280×720p, then the first video frame and the second video frame have a resolution of 1280×720p,
   when the resolution is one of 1920×1080i and 1920×1080p, then the first video frame and the second video frame have a resolution of 1920×1080p, and
   when the resolution is 4K×2K, then the first video frame and the second video frame have a resolution of 4K×2K.

4. A 3-Dimensional (3D) image display method comprising:
   receiving 3D video data including a plurality of left-view video data and a plurality of right-view video data;
   changing a frame rate of the received 3D video data, the frame rate of the received 3D video data is changed to half the frame rate of a display when the frame rate of the received 3D video data and the frame rate of the display are the same;
   generating a first video frame and a second video frame based on the plurality of left-view video data and the plurality of right-view video data included in the 3D video data having the changed frame rate; and
   outputting the first video frame and the second video frame,
   wherein a left-view video frame includes the plurality of left-view video data having a first odd line data (L1, L3, L5, L7) and a first even line data (L2, L4, L6, L8),
   a right-view video frame includes the plurality of right-view video data having a second odd line data (R1, R3, R5, R7) and a second even line data (R2, R4, R6, R8),
   wherein the odd line of the first video frame is a fixed one of the first odd line data (L1, L3, L5, L7, L9),
   the even line of the first video frame is changed from one of the second odd line data (R1, R3, R5, R7) to one of the second even line data (R2, R4, R6, R8),
   the odd line of the second video frame is a fixed one of the first even line data (L2, L4, L6, L8, L10), and
   the even line of the second video frame is changed from one of the second even line data (R2, R4, R6, R8) to one of the second odd line data (R1, R3, R5, R7), wherein the first video frame and the second video frame are generated in an order of receiving the left-view video frame and the right-view video frame, and the left-view video frame and the right-view video frame are received at a time interval corresponding to the frame rate of a corresponding video frame.

5. An electronic device comprising:
a receiver configured to receive 3-dimensional (3D) video data including a plurality of left-view video data and a plurality of right-view video data;
a frame rate converter configured to change a frame rate of the received 3D video data, the frame rate of the received 3D video data is changed to half the frame rate of a display when the frame rate of the received 3D video data and the frame rate of the display are the same;
a formatter configured to generate a first video frame and a second video frame based on the plurality of left-view video data and the plurality of right-view video data included in the 3D video data having the changed frame rate; and
the display configured to scan the first video frame and the second video frame,
wherein a left-view video frame includes the plurality of left-view video data having a first odd line data (L1, L3, L5, L7) and a first even line data (L2, L4, L6, L8), and
a right-view video frame includes the plurality of right-view video data having a second odd line data (R1, R3, R5, R7) and a second even line data (R2, R4, R6, R8),
wherein the odd line of the first video frame is a fixed one of the first odd line data (L1, L3, L5, L7, L9),
the even line of the first video frame is changed from one of the second odd line data (R1, R3, R5, R7) to one of the second even line data (R2, R4, R6, R8), the odd line of the second video frame is a fixed one of the first even line data (L2, L4, L6, L8, L10), and the even line of the second video frame is changed from one of the second even line data (R2, R4, R6, R8) to one of the second odd line data (R1, R3, R5, R7), wherein the first video frame and the second video frame are generated in an order of receiving the left-view video frame and the right-view video frame, and the left-view video frame and the right-view video frame are received at a time interval corresponding to the frame rate of a corresponding video frame.

6. The electronic device of claim 5, wherein a resolution of each of the left-view video data and the right-view video data is one of 720×480p, 1280×720p, 1920×1080i, 1920×1080p and 4K×2K, when the resolution is 720×480p, then the first video frame and the second video frame have a resolution of 720×480p, when the resolution is 1280×720p, then the first video frame and the second video frame have a resolution of 1280×720p, when the resolution is one of 1920×1080i and 1920×1080p, then the first video frame and the second video frame have a resolution of 1920×1080p, and when the resolution is 4K×2K, then the first video frame and the second video frame have a resolution of 4K×2K.

7. The electronic device of claim 5, further comprising a frame rate converter configured to convert a frame rate of each of the left-view video data and the right-view video data to half an output frame rate.

* * * * *